(12) United States Patent
Dungworth et al.

(10) Patent No.: US 7,790,244 B2
(45) Date of Patent: *Sep. 7, 2010

(54) STRONGLY ADHERENT COATINGS

(75) Inventors: Howard Roger Dungworth, Brighouse (GB); Andrew John Naisby, Kennett Square, PA (US); John Mark Plonka, Rawdon (GB); Julie Ann List, Bay City, MI (US)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 730 days.

This patent is subject to a terminal disclaimer.

(21) Appl. No.: 11/502,082

(22) Filed: Aug. 10, 2006

(65) Prior Publication Data
US 2007/0088118 A1   Apr. 19, 2007

Related U.S. Application Data

(60) Provisional application No. 60/707,575, filed on Aug. 12, 2005.

(51) Int. Cl.
*B05D 3/02* (2006.01)
*B05D 3/06* (2006.01)

(52) U.S. Cl. .................... 427/508; 427/294; 427/385.5; 427/388.1; 427/393.5

(58) Field of Classification Search .................. None
See application file for complete search history.

(56) References Cited

U.S. PATENT DOCUMENTS 6,548,121 B1    4/2003  Bauer et al. .................. 427/509
6,863,934 B2    3/2005  Iida et al. .................... 427/533
2002/0127376 A1  9/2002  Hutter et al. ................. 428/195
2005/0032931 A1  2/2005  Naisby et al. ............... 523/160

FOREIGN PATENT DOCUMENTS

EP    0 164 520     12/1985
EP    1415823    *  5/2004

OTHER PUBLICATIONS

English Language abstract for EP 0 164 520 printed from esp@cenet.com on Nov. 10, 2006.
Chee-Chan Wang et al., Journal of Polymer Science: Part A: Polymer Chemistry, vol. 31, pp. 1307-1314, (1993).

* cited by examiner

*Primary Examiner*—Erma Cameron
(74) *Attorney, Agent, or Firm*—Joseph Suhadolnik

(57) ABSTRACT

This invention relates to strongly adhering coating compositions comprising at least one copolymer or cooligomer as an adhesion promoter, which copolymer or cooligomer comprises monomer units derived from at least one monomer selected from the group consisting of the acrylate and acrylamide monomers, at least one monomer selected from the group consisting of the amine containing ethylenically unsaturated monomers, at least one monomer selected from the group consisting of ethylenically unsaturated associative monomers and at least one monomer selected from the group consisting of the polyacrylates of polyols. The amine sites of the copolymers or cooligomers are at least partially neutralized with acid prior to film casting the coating formulation.

15 Claims, No Drawings

STRONGLY ADHERENT COATINGS

This application claims benefit under 35 USC 119(e) of U.S. provisional application No. 60/707,575, filed Aug. 12, 2005.

This invention provides strongly adhering coating compositions comprising at least one copolymer or cooligomer as an adhesion promoter, which copolymer or cooligomer comprises monomer units derived from at least one monomer selected from the group consisting of the acrylate and acrylamide monomers, at least one monomer selected from the group consisting of the amine containing ethylenically unsaturated monomers, at least one monomer selected from the group consisting of ethylenically unsaturated associative monomers and at least one monomer selected from the group consisting of the polyacrylates of polyols. The amine sites of the copolymers or cooligomers are at least partially neutralized with acid prior to film casting the coating formulation.

This invention also provides a method for improving the adhesion of coatings and other polymeric substrates via the incorporation of said copolymers or cooligomers. In certain instances the neutralizing acid is removed during curing or drying of the coating.

The copolymers or cooligomers of the instant invention are useful as adhesion promoters in the preparation of coating layers, such layers being for example protective coatings, certain ink receptor layers, toner receptor layers, overprint varnishes, primer coatings or other intermediate layers of a multilayered article; as adhesion promoters in an adhesive layer holding two layers together or as adhesion promoters in certain inks or in toners as found in printing or electrophotography.

BACKGROUND

The inherent adhesion of many coating chemistries to various substrates, for example glass, plastics or metal, has proved to be inadequate in many technical applications. This has led in some cases to the use of primers which enable a good bond to be obtained between the coating and the substrate.

For example, in "Silane Coupling Agents", Plueddemann et al, Plenum Press, New York (1982), aminoalkyl-alkoxysilanes have been proposed as suitable primers for polyurethanes.

Various modified aminosilanes, e.g. ketimines and aldimines of aminoalkylsilanes have been suggested, in EP 164520, for addition to polyurethane adhesives, and have been found not to impair the storage stability of the polyurethane adhesives.

The adhesion properties of coatings (e.g. finishes, paints, printing inks or adhesives) on organic and inorganic metalized substrates are also frequently inadequate. For that reason additional treatments are carried out in order to achieve satisfactory results.

The adhesion can be improved by exposing the substrates to be coated to a plasma treatment or corona treatment and then coating them, it being possible for a grafting process with e.g. acrylate monomers to be carried out between those two operations (J. Polym. Sci., Part A: Polym. Chem. 31, 1307-1314 (1993)).

It is also possible in plasmas to carry out polymerisations that result in the deposition of polymeric layers and can be used as primers, for example, H. Biederman, Y. Osada "Plasma Polymerization Processes" in "Plasma technology 3" edited by L. Holland, Elsevier, Amsterdam 1992.

WO 00/24527 discloses the plasma treatment of substrates with immediate vapour-deposition and grafting-on of photo initiators in vacuo. A disadvantage, however, is that vapour-deposition requires the use of vacuum apparatus and, because of low deposition rates, is not very efficient and is not suitable for industrial applications having high throughput rates. PCT patent application No. EP03/00780 discloses a similar process.

There is a need in the art for compositions and methods that provide for good adhesion of coatings, including inks, and laminates, to substrates such as polymers, glass and metalized substrates that can be readily practiced and are not too expensive in terms of apparatus and materials by means of which the subsequent coating of those substrates is improved.

Co-pending U.S. patent application Ser. No. 10/890,449, incorporated herein in its entirety by reference, discloses ink jet recording media comprising neutralized or partially neutralized copolymers which comprise a) at least one monomer unit derived from acrylates and acrylamides, b) at least one amine containing ethylenically unsaturated monomer and c) at least one monomer derived from polyacrylates of polyols and optionally d) an ethylenically unsaturated associative monomer.

It has been found that copolymers containing at least one monomer from each of the preceding four monomer classes, a), b), c), and d), are effective adhesion promoters allowing for better adhesion of coatings to a variety of substrates. In particular, coatings comprising said co-polymers exhibit good adhesion to, for example, polymeric substrates. Such coatings are very effective as primer layers which are subsequently coated as with a paint or ink. In the context of this invention, inks are viewed as a particular type of coating.

SUMMARY OF THE INVENTION

Coating compositions having especially good adhesion can be obtained by incorporating therein certain copolymers or cooligomers as adhesion promoters, which copolymers or cooligomers comprise monomer units derived from at least one monomer selected from the group consisting of the acrylate and acrylamide monomers, at least one monomer selected from the group consisting of the amine containing ethylenically unsaturated monomers, at least one monomer selected from the group consisting of ethylenically unsaturated associative monomers and at least one monomer selected from the group consisting of polyacrylates of polyols. The amine sites of the copolymers or cooligomers are at least partially neutralized with acid prior to application of the coating formulation.

The resulting coatings exhibit surprisingly good adhesion to organic and inorganic substrates which does not suffer any appreciable deterioration even after storage or exposure to sunlight.

The present copolymers or cooligomers are prepared by free radical polymerization techniques, which techniques are well known to those skilled in the art. For instance, the present copolymers or cooligomers are emulsion copolymers or cooligomers, prepared by the methods described in US Published Pat. Application 2002/0127376, the disclosure of which is hereby incorporated by reference.

The present copolymers or cooligomers are at least partially neutralized with acid as in US Published Pat. Application 2005/0032931 (U.S. patent application Ser. No. 10/890,449) prior to application to the substrate. This pH adjustment, or "combination with acid" or "neutralization with acid" or "addition of acid" may be performed at any stage of formulation. For example, the neutralization with acid is performed during the preparation of the copolymer or cooligomer, or the formulation of the coating. The acid partially or completely neutralizes the amine sites of the copolymers or cooligomers.

Advantageously the acid, for example formic or acetic acid, may be removed from the coating upon curing or drying. Drying takes place for instance upon heating or at ambient temperature. Curing may result as a natural consequence of drying, or may be the result of thermal treatment or exposure to ultraviolet light.

DETAILED DESCRIPTION OF THE INVENTION

This invention provides a cured or uncured strongly adhering coating composition that comprises as an adhesion promoter at least one copolymer or cooligomer comprising monomer units derived from at least one monomer selected from the group consisting of the acrylate and acrylamide monomers, at least one monomer selected from the group consisting of the amine containing ethylenically unsaturated monomers, at least one monomer selected from the group consisting of ethylenically unsaturated associative monomers and at least one monomer selected from the group consisting of the polyacrylates of polyols.

This invention also provides a cured or uncured strongly adhering coating composition that comprises as an adhesion promoter at least one copolymer or cooligomer comprising monomer units derived from at least one monomer selected from the group consisting of the acrylate and acrylamide monomers, at least one monomer selected from the group consisting of the amine containing ethylenically unsaturated monomers, at least one monomer selected from the group consisting of ethylenically unsaturated associative monomers and at least one monomer selected from the group consisting of the polyacrylates of polyols, wherein said copolymer or cooligomer is at least partially neutralized with acid.

This invention also provides a cured strongly adhering coating composition comprising the aforementioned at least one copolymer or cooligomer as an adhesion promoter, wherein the copolymer or cooligomer is not neutralized or partially neutralized with acid.

The invention also provides a method for improving the adhesion of coatings and other polymeric substrates to a substrate wherein the aforementioned copolymers or cooligomers are added to coating or polymer formulations, wherein the copolymer or cooligomer is at least partially neutralized with acid prior to application to the substrate.

The invention also provides a method for coating an inorganic or organic substrate or inorganic or organic metalized substrate, wherein a strongly adherent coating composition comprising at least one copolymer or cooligomer form above as adhesion promoters is prepared, the copolymer or cooligomer are partially or fully neutralized with a neutralizing acid prior to or upon incorporation into the coating composition, the partially or fully neutralized formulation is applied to the surface of a substrate or between two substrates and the coating formulation is dried or cured.

Drying or curing occurs, for example, under ambient conditions, under vacuum or reduced pressure, by heating, or by exposure to ultraviolet light.

Also provided is method as above wherein the neutralizing acid is partially or fully removed upon drying or curing, for example, the neutralizing acid is partially or fully removed upon heating or under vacuum, such as in the evaporation of, for example, acetic or formic acid.

The neutralizing acid can also be removed by washing with an appropriate solvent or solution after the coating is dried or cured, for example, citric acid can be washed out of a cured coating.

The neutralizing acid can also be quenched by the presence of a base such as a latent base after the coating is applied, dried or cured. For example, a photo-latent base may be activated after application, drying or curing the coating.

The strongly adhering coating composition is applied by any conventional means including dip coating, spray coating, spin coating, draw down, or by brush, roller or any other means of application.

The copolymers or cooligomers of the invention may be used as the sole resin in the coating formulation or in combination with other resins.

The copolymers or cooligomers of the instant invention are useful as adhesion promoters in the preparation of coating layers, such layers being for example protective coatings, ink receptor layers other than ink jet receptive layers, toner receptor layers, overprint varnishes, primer coatings or other intermediate layers of a multilayered article; as adhesion promoters between two layers in an adhesive layer holding two layers together or as adhesion promoters in inks other than ink jet inks or toners as found in printing or electrophotography.

The coating or layer containing the adhesion promoter copolymers or cooligomers may itself have an additional layer applied thereon by any known process. For example, an additional coating or coatings may be applied, a polymeric film layer or layers may be applied, or another inorganic or organic substrate or another inorganic or organic metallized substrate may be affixed. Such additional layers or substrates may be applied or affixed either before or after the coating of the instant invention is dried or cured.

The strongly adhering coatings of the instant invention are, for example, protective coatings, ink receptor layers other than ink jet receptive layers, toner receptor layers, overprint varnishes, adhesive layers between two substrates, primer layers or coatings, electrostatic control coatings, printing inks other than ink jet inks, toners as found electrophotography or xerography, a surface which receives toner or is another printable substrate, or a polymeric layer of a multilayered article or laminate into which layer the copolymers or cooligomers instant invention are added for improved adhesion.

The inorganic or organic substrate to be coated can be in any solid form. The substrate may be, for example, a thermoplastic, elastomeric, inherently crosslinked or crosslinked polymer, a ceramic material, glass, metal, leather or textile.

For example, the inorganic or organic substrate is a thermoplastic, elastomeric, inherently crosslinked or crosslinked polymer.

Examples of thermoplastic, elastomeric, inherently crosslinked or crosslinked polymers are listed below.

1. Polymers of mono- and di-olefins, for example polypropylene, polyisobutylene, polybutene-1, poly-4-methylpentene-1, polyisoprene or polybutadiene and also polymerisates of cyclo-olefins, for example of cyclopentene or norbornene; and also polyethylene (which may optionally be crosslinked), for example high density polyethylene (HDPE), high density polyethylene of high molecular weight (HDPE-HMW), high density polyethylene of ultrahigh molecular weight (HDPE-UHMW), medium density polyethylene (MDPE), low density polyethylene (LDPE), and linear low density polyethylene (LLDPE), (VLDPE) and (ULDPE).

Polyolefins, that is to say polymers of mono-olefins, as mentioned by way of example in the preceding paragraph, especially polyethylene and polypropylene, can be prepared by various processes, especially by the following methods:

a) by free radical polymerisation (usually at high pressure and high temperature);
b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π or σ-coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may have been modified, for example, with further ester, ether, amine or silyl ether groups. Such catalyst systems are usually referred to as Phillips, Standard Oil Indiana, Ziegler (-Natta), TNZ (DuPont), metallocene or Single Site Catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, for example polyamides.

4. Hydrocarbon resins (for example $C_5$-$C_9$) including hydrogenated modifications thereof (for example tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate and methacrylate, styrene/maleic anhydride, styrene/acrylo-nitrile/methyl acrylate; high-impact-strength mixtures consisting of styrene copolymers and another polymer, for example a polyacrylate, a diene polymer or an ethylene/-propylene/diene terpolymer; and also block copolymers of styrene, for example styrene/-butadiene/styrene, styrene/isoprene/styrene, styrene/ethylene-butylene/styrene or styrene/ethylene-propylene/styrene.

7. Graft copolymers of styrene or α-methylstyrene, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, for example polychloroprene, chlorinated rubber, chlorinated and brominated copolymer of isobutylene/isoprene (halobutyl rubber), chlorinated or chlorosulfonated polyethylene, copolymers of ethylene and chlorinated ethylene, epichlorohydrin homo- and co-polymers, especially polymers of halogen-containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α,β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers, for example ethylene oxide; polyacetals modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxyl groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides, polyether imides, polyester imides, polyhydantoins and polybenzimidazoles.
18. Polyesters derived from dicarboxylic acids and dialcohols and/or from hydroxy-carboxylic acids or the corresponding lactones, such as polyethylene terephthalate, polybutylene terephthalate, poly-1,4-dimethylolcyclohexane terephthalate, polyhydroxy-benzoates, and also block polyether esters derived from polyethers with hydroxyl terminal groups; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, urea or melamine on the other hand, such as phenol-formaldehyde, urea-formaldehyde and melamine-formaldehyde resins.
22. Drying and non-drying alkyd resins.
23. Unsaturated polyester resins derived from copolyesters of saturated and unsaturated dicarboxylic acids with polyhydric alcohols, and also vinyl compounds as crosslinking agents, and also the halogen-containing, difficultly combustible modifications thereof.
24. Crosslinkable acrylic resins derived from substituted acrylic esters, e.g. from epoxy acrylates, urethane acrylates or polyester acrylates.
25. Alkyd resins, polyester resins and acrylate resins that are crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of bisphenol-A diglycidyl ethers, bisphenol-F diglycidyl ethers, that are crosslinked using customary hardeners, e.g. anhydrides or amines with or without accelerators.
27. Natural polymers, such as cellulose, natural rubber, gelatin, or polymer-homologously chemically modified derivatives thereof, such as cellulose acetates, propionates and butyrates, and the cellulose ethers, such as methyl cellulose; and also colophonium resins and derivatives.
28. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The thermoplastic, elastomeric, crosslinked or inherently crosslinked polymer is for example a polyolefin, thermoplastic polyolefin, polyurethane, polyamide, polyacrylate, polycarbonate, polystyrene, polyester or a halogenated vinyl polymer such as PVC.

Excellent results are achieved when the thermoplastic, elastomeric, crosslinked or inherently crosslinked polymer is, for example, a polyamide, polyacrylate, polycarbonate or polyester, for example, a polyester or polycarbonate.

The polymers may be, for example, in the form of films, injection-moulded articles, extruded workpieces, fibres, felts or woven fabrics.

The substrate can for example be one as used in the commercial printing area, sheet-fat- or web-printing, posters, calendars, forms, labels, wrapping foils, tapes, credit cards, furniture profiles, etc.

The substrates or coating compositions are not restricted to the use in the non-food area. The substrate may also be, for example, a material for use in the field of nutrition, e.g. as packaging for foodstuffs, cosmetics, medicaments, etc. The coating composition may be used in a cosmetic application, for example in nail varnishes or in hair products such as conditioners, dyes etc.

Where substrates have been pre-treated according to processes of the invention it is also possible, for example, for substrates that usually have poor compatibility with one another to be adhesively bonded to one another or laminated.

Within the context of the present invention, paper should also be understood as being an inherently crosslinked polymer, especially in the form of cardboard, which can additionally be coated with e.g. an oil or moisture repellent coating. Such substrates are, for example, commercially available.

As inorganic substrates there come into consideration, for example, glass, ceramic materials, metal oxides and metals. They may be silicates and semi-metal or metal oxide glasses which are preferably in the form of layers or in the form of powders preferably having average particle diameters of from 10 nm to 2000 μm. The particles may be dense or porous. Examples of oxides and silicates are $SiO_2$, $TiO_2$, $ZrO_2$, MgO, NiO, $WO_3$, $Al_2O_3$, $La_2O_3$, silica gels, clays and zeolites. Preferred inorganic substrates, in addition to metals, are silica gels, aluminum oxide, titanium oxide and glass and mixtures thereof.

As metal substrates there come into consideration, for example, Fe, Al, Ti, Ni, Mo, Cr and steel alloys.

The term "monomer units derived from" means the starting monomer is reacted into, and thus is part of, the finished copolymer or cooligomer. Each individual reacted monomer molecule is a "monomer unit" when part of a copolymer or cooligomer.

The present copolymers or cooligomers are prepared by free radical polymerization techniques, which techniques are well known to those skilled in the art. For instance, the present copolymers or cooligomers are emulsion copolymers or cooligomers, prepared by the methods described in US Published Pat. Application 2002/0127376, the disclosure of which is hereby incorporated by reference.

The present copolymers or cooligomers are typically at least partially neutralized with a neutralizing acid prior to or during formulation of the coating composition.

For example, the present copolymers or cooligomers are formulated into coating formulations (coatings). The coating formulations are adjusted with acid to a pH of from about 3 to about 7. For instance, the pH of the present coating formulations is from about 3 to about 6, from about 4 to about 7, or from about 4 to about 6. The coating formulations comprise for example the emulsion copolymer or cooligomer, water and other ingredients. That is, the coating formulations are for example aqueous coating formulations (aqueous coatings). That is to say, the coating layers comprising the present neutralized copolymers or cooligomers exhibit said pH limits prior to drying or curing.

Acids that are convenient to employ for neutralization of the copolymers or cooligomers are for example mineral acids, such as sulfuric or hydrochloric acids, or organic acids, such as carboxylic acids or sulfonic acids. For example, the acid employed for neutralization is formic acid, acetic acid, propionic acid, glycolic acid, lactic acid, citric acid and the like.

In some applications it is desirable to remove or quench the neutralizing acid after applying the strongly adherent coating. Volatile acids like formic acid and acetic acid may be removed (may evaporate) upon drying or curing. As stated earlier, the acids may also be washed out of the cured coating or quenched by introducing a base or activating a latent base, such as a photo-latent base.

For example, when volatile acids are employed, the acid is removed upon drying or curing of the coating with heat or at ambient temperature. The acid may also be removed under vacuum or reduced pressure. For example, greater than about 80 mol % of the neutralization acid is ultimately removed from the coating. For instance, greater than about 90%, about 95% or greater than about 98 mol % of the volatile acid is ultimately removed.

The present copolymers or cooligomers comprise from about 99.79 to about 0.1 weight percent monomer units derived from at least one monomer selected from the group consisting of the acrylate and acrylamide monomers, about 99.79 to about 0.1 weight percent monomer units derived from at least one monomer selected from the group consisting of amine containing ethylenically unsaturated monomers, about 99.79 to about 0.1 weight percent monomer units derived from at least one monomer selected from the group consisting of ethylenically unsaturated associative monomers and from about 99.7 to about 0.01 weight percent monomer units derived from at least one monomer selected from the group consisting of the polyacrylates of polyols.

For example, the present copolymers or cooligomers comprise from about 20 to about 80 weight percent monomer units derived from at least one monomer selected from the group consisting of the acrylate and acrylamide monomers, about 20 to about 80 weight percent monomer units derived from at least one monomer selected from the group consisting of amine containing ethylenically unsaturated monomers, about 0.5 to about 30 weight percent monomer units derived from at least one monomer selected from the group consisting of ethylenically unsaturated associative monomers and from about 0.01 to about 10 weight percent monomer units derived from at least one monomer selected from the group consisting of the polyacrylates of polyols.

For example, the present copolymers or cooligomers comprise from about 30 to about 80 weight percent monomer units derived from at least one monomer selected from the group consisting of the acrylate and acrylamide monomers, about 20 to about 70 weight percent monomer units derived from at least one monomer selected from the group consisting of amine containing ethylenically unsaturated monomers, about 1 to about 10 weight percent monomer units derived from at least one monomer selected from the group consisting of ethylenically unsaturated associative monomers and from about 0.1 to about 1.0 weight percent monomer units derived from at least one monomer selected from the group consisting of the polyacrylates of polyols.

For example the present copolymers or cooligomers comprise from about 0.2 to about 0.6 weight percent monomer units derived from at least one monomer selected from the group consisting of the polyacrylates of polyols.

The weight percent monomer units are based on the weight of the polymer. That is, it does not include other ingredients of an emulsion polymer such as surfactant, initiator, solvent, biocides, and the like.

The present copolymers or cooligomers at a minimum contain monomer units derived from at least four different ethylenically unsaturated monomers, the four classes being "acrylate and acrylamide monomers", "amine containing ethylenically unsaturated monomers", "ethylenically unsaturated associative monomers" and "polyacrylates of polyols".

The present copolymers or cooligomers comprise monomer units derived from one or more than one monomer selected from the group consisting of the acrylate and acrylamide monomers. The copolymers or cooligomers comprise monomer units derived from one or more than one amine containing ethylenically unsaturated monomer. The copolymers and cooligomers comprise monomer units derived from one or more than one ethylenically unsaturated associative monomer. The copolymers and cooligomers comprise monomer units derived from one or more than one polyacrylate of a polyol monomer.

The monomers according to this invention are polymerizable allylic, vinylic or acrylic compounds. That is, they are ethylenically unsaturated.

The acrylate monomers of this invention are for example acrylic or methacrylic esters of alcohols containing from 1 to 22 carbon atoms.

The acrylate monomers of this invention are for example acrylic acid, methacrylic acid, methyl acrylate, ethyl acrylate, butyl acrylate, 2-ethylhexyl acrylate, isobornyl acrylate, methyl methacrylate, ethyl methacrylate and butyl methacrylate.

The acrylamide monomers of this invention are for example acrylamide, methacrylamide, N-methylacrylamide, N,N-dimethylacrylamide, N,N-dimethyl(meth)acrylamide, N-isopropyl(meth)acrylamide, diacetone acrylamide or N-morpholinoacrylamide.

For instance, the present acrylate and acrylamide monomers are selected from the group consisting of acrylamide, methacrylamide, methyl acrylate, methyl methacrylate, diacetone acrylamide and N,N-dimethyl acrylamide.

For example, the present acrylate and acrylamide monomers are selected from the group consisting of acrylamide, methacrylamide and methylmethacrylate.

The amine containing ethylenically unsaturated monomers of this invention are for example dialkylaminoalkyl acrylates or methacrylates, dialkylaminoalkylacrylamides or methacrylamides, allyl amine, 2-vinylpyridine, 4-vinylpyridine or N',N'-dimethylaminoethyl-N,N-dimethylammonium-N-propyl methacrylate chloride.

The amine containing ethylenically unsaturated monomers of this invention are for example dimethylaminoethyl acrylate, dimethylaminoethyl methacrylate, diethylaminoethyl methacrylate, dimethylaminopropyl acrylamide, tert-butylaminoethyl methacrylate, dimethylaminopropyl methacrylamide, allyl amine, 2-vinylpyridine or 4-vinylpyridine. The amine containing ethylenically unsaturated monomers may contain a quarternary ammonium group, for example N',N'-dimethylaminoethyl-N,N-dimethylammonium-N-propyl methacrylate chloride.

For example, the present amine containing ethylenically unsaturated monomers are dimethylaminopropyl acrylamide or dimethylaminopropyl methacrylamide.

For instance, the amine containing ethylenically unsaturated monomers are dimethylaminoethyl methacrylate or tert-butylaminoethyl methacrylate.

Alkyl is for instance methyl, ethyl, n-propyl, iso-propyl, n-, sec-, iso- and tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl or 2-ethylhexyl.

The associative monomers are known and are ethylenically unsaturated amphiphilic monomers, for example unsaturated esters of polyalkoxylated $C_{8-32}$ alcohols, unsaturated esters of poly alkylene glycols, unsaturated ethers of polyalkoxylated $C_{8-32}$ alcohols and unsaturated ethers of poly alkylene glycols.

Polyalkoxylated alcohols are those alcohols substituted by two or more repeating alkoxy units, for example 2-50 repeating alkoxy units, for example 2-30 repeating alkoxy units.

The repeating alkoxy units are, for example, $C_{1-6}$ alkoxy units; for example $C_{1-3}$ alkoxy units; for example, ethoxy or propoxy units.

The parent $C_{8-32}$ alcohols which are polyethoxylated may be linear, cyclic or branched. For example, $C_{8-32}$ alkanols or alkenols. For example, $C_{12-32}$ alkanols or alkenols; for example $C_{12-24}$ alkanols or alkenols.

For example, the associative monomers are stearyl ethoxy (25) methacrylate, stearyl ethoxy (20) methacrylate, behenyl ethoxy (25) methacrylate, stearyl ethoxy (10) allyl ether, poly(ethylene glycol)(meth)acrylate, poly(ethylene glycol) monomethyl ether mono(meth)acrylate, poly(ethylene glycol)acrylate or poly(ethylene glycol)monomethyl ether monoacrylate. The numbers in parentheses mean the number of repeating ethoxy units.

For example, the associative monomers are stearyl ethoxy (25) methacrylate, stearyl ethoxy (20) methacrylate, stearyl ethoxy (10) allyl ether or poly(ethylene glycol) 350 monomethyl ether mono(meth)acrylate.

The polyacrylates of polyols are acrylic and/or methacrylic esters of aromatic, aliphatic or cycloaliphatic polyols.

Aromatic polyols are typically hydroquinone, 4,4'-dihydroxydiphenyl, 2,2-bis(4-hydroxyphenyl)propane and cresols.

Aliphatic and cycloaliphatic polyols are for example alkylene polyols containing 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol, tripentaerythritol and sorbitol.

The polyols may be esterified partially or completely with acrylate or methacrylate groups, in which case the free hydroxyl groups of the partial esters may be modified, for example etherified, or esterified with other carboxylic acids.

The polyacrylates of polyols comprise at least two acrylate groups. The polyols comprise at least two hydroxy groups. Therefore the simplest polyacrylate of a polyol according to this invention is a diacrylate of a diol, for example the diacrylate of butanediol. That is to say, the term "poly" of polyacrylate and polyol means 2 or more, for example 2, 3, 4, 5 or 6. The polyacrylates are acrylic esters or methacrylic esters, or mixtures thereof.

The polyacrylates of polyols of this invention are for example ethylene glycol diacrylate, propylene glycol diacrylate, neopentyl glycol diacrylate, hexamethylene glycol diacrylate, 1,4-butanediol diacrylate, 1,4-butanediol dimethacrylate, bisphenol A diacrylate, bisphenol A diamethacrylate, 4,4'-bis(2-acryloyloxyethoxy)diphenylpropane, trimethylol propane triacrylate, tris(2-acryloylethyl) isocyanurate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, 1,3-butanediol diacrylate, 1,3-butanediol dimethacrylate, sorbitol triacrylate, sorbitol tetraacrylate, pentaerythritol-modified triacrylate, sorbitol tetramethacrylate, sorbitol pentacrylate, sorbitol hexacrylate, glycerol di- and-triacrylate or 1,4-cyclohexanediacrylate. Acrylates of these monomers may be interchanged with methacrylates and vice versa.

The present polyacrylate of a polyol is for example pentaerythritol triacrylate.

The copolymers or cooligomers of this invention may further comprise monomer units derived from at least one ethylenically unsaturated monomer selected from the group consisting of ethylenically unsaturated monomers containing quaternary ammonium groups, hydroxy containing ethylenically unsaturated monomers or other ethylenically unsaturated monomers.

Ethylenically unsaturated monomers containing quaternary ammonium groups according to this invention are for example vinylbenzyltrimethylammonium chloride, methacryloyloxyethyltrimethylammonium chloride, methacrylamidopropyltrimethylammonium chloride, N,N-dimethylaminoethylacrylate methyl chloride quaternary salt (DMAEA.MCQ), diallyldimethylammonium chloride (DADMAC), and the like.

Hydroxy containing ethylenically unsaturated monomers according to this invention are for example N-methylolacrylamide, N-methylolmethacrylamide, N-(2-hydroxypropyl) acrylamide, N-(2-hydroxypropyl)methacrylamide, 2-hydroxyethylacrylate, 2-hydroxyethyl(meth)acrylate (HEMA), hydroxypropyl acrylate, hydroxypropyl(meth)acrylate, hydroxybutylacrylate, hydroxybutyl(meth)acrylate, butanediol monovinyl ether or allyl alcohol.

For example, the present hydroxy containing ethylenically unsaturated monomers are N-methylolacrylamide, N-methylolmethacrylamide, N-(2-hydroxypropyl)acrylamide, N-(2-hydroxypropyl)methacrylamide, 2-hydroxyethylacrylate, 2-hydroxyethyl(meth)acrylate (HEMA) or glycerol mono ((meth)acrylate).

For example, the present hydroxy containing ethylenically unsaturated monomers are N-methylolacrylamide, N-(2-hydroxypropyl)methacrylamide, 2-hydroxyethyl(meth)acrylate (HEMA) or glycerol mono((meth)acrylate).

For instance, the present hydroxy containing ethylenically unsaturated monomer is N-methylolacrylamide.

Other ethylenically unsaturated monomers according to this invention are for example N-vinyl-2-pyrrolidone, vinyl methylsulfone, vinyl acetate, N-vinylformamide, N-vinylacetamide, N-vinyl-N-methylacetamide, styrene, substituted styrenes such as α-methylstyrene, acrylonitrile, methacrylonitrile, vinyl chloride, vinylidene chloride, vinyl ethers, vinyl esters and N-vinyl amides.

The alcohols of 1 to 22 carbon atoms are for example alcohols of methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetra-methylbutyl, 1-methylheptyl, 3-methylheptyl, n-octyl, 2-ethylhexyl, benzyl, cyclohexyl or cyclopentyl.

For instance, the present copolymers or cooligomers comprise monomer units derived from at least one monomer selected from the group consisting of acrylamide, methacrylamide, methyl acrylate, methyl methacrylate, diacetone acrylamide and N,N-dimethyl acrylamide, monomer units derived from at least one monomer selected from the group consisting of dimethylaminoethyl methacrylate, t-butylaminoethyl methacrylate and dimethylaminopropyl methacrylamide, monomer units derived from at least one monomer selected from the group consisting of stearyl ethoxy (25) methacrylate, stearyl ethoxy (20) methacrylate, stearyl ethoxy (10) allyl ether, poly(ethylene glycol) 350 monomethyl ether mono(meth)acrylate and monomer units derived from pentaerythritol triacrylate.

For example, the present copolymers or cooligomers comprise monomer units derived from at least one monomer selected from the group consisting of acrylamide, methacrylamide and methylmethacrylate, monomer units derived from at least one monomer selected from the group consisting of dimethylaminoethyl methacrylate and t-butylaminoethyl methacrylate, monomer units derived from at least one monomer selected from the group consisting of stearyl ethoxy (25) methacrylate, stearyl ethoxy (20) methacrylate, stearyl ethoxy (10) allyl ether, poly(ethylene glycol) 350 monomethyl ether mono(meth)acrylate and monomer units derived from pentaerythritol triacrylate.

For instance, the present copolymers or cooligomers comprise monomer units derived from methyl methacrylate, dimethylaminoethyl methacrylate or t-butylaminoethyl methacrylate, pentaerythritol triacrylate and stearyl ethoxy (25) methacrylate or stearyl ethoxy (20) methacrylate.

For instance, the present copolymers or cooligomers comprise monomer units derived from methyl methacrylate, dimethylaminoethyl methacrylate or t-butylaminoethyl methacrylate, pentaerythritol triacrylate and stearyl ethoxy (10) allyl ether or poly(ethylene glycol) 350 monomethyl ether mono(meth)acrylate.

For instance, the present copolymers or cooligomers comprise monomer units derived from at least one monomer selected from the group consisting of acrylic or methacrylic esters of alcohols containing from 1 to 22 carbon atoms, monomer units derived from at least one monomer selected from the group consisting of dialkylaminoalkyl acrylates or methacrylates, dialkylaminoalkylacrylamides or methacrylamides, allyl amine, 2-vinylpyridine, 4-vinylpyridine and N',N'-dimethylaminoethyl-N, N-dimethylammonium-N-propyl methacrylate chloride, monomer units derived from at least one monomer selected from the group consisting of unstaurated esters of polyalkoxylated $C_{8-32}$ alcohols, unstaurated esters of poly alkylene glycols, unsaturated ethers of polyalkoxylated $C_{8-32}$ alcohols and unsaturated ethers of poly alkylene glycols and monomer units derived from at least one monomer selected from the group consisting of acrylic and methacrylic esters of aromatic, aliphatic or cycloaliphatic polyols.

For instance, the present copolymers or cooligomers comprise monomer units derived from at least one monomer selected from the group consisting of acrylic acid, methacrylic acid, methyl acrylate, ethyl acrylate, butyl acrylate, 2-ethylhexyl acrylate, isobornyl acrylate, methyl methacrylate, ethyl methacrylate and butyl methacrylate, monomer units derived from at least one monomer selected from the group consisting of dimethylaminoethyl acrylate, dimethylaminoethyl methacrylate, diethylaminoethyl methacrylate, dimethylaminopropyl acrylamide, tert-butylaminoethyl methacrylate, dimethylaminopropyl methacrylamide, allyl amine, 2-vinylpyridine, 4-vinylpyridine and N',N'-dimethylaminoethyl-N,N-dimethylammonium-N-propyl methacrylate chloride, monomer units derived from at least one monomer selected from the group consisting of acrylic and methacrylic esters of polyalkoxylated $C_{8-32}$ alcohols, acrylic and methacrylic esters of poly alkylene glycols, allyl ethers of polyalkoxylated $C_{8-32}$ alcohols and allyl ethers of poly alkylene glycols and monomer units derived from at least one monomer selected from the group consisting of acrylic and methacrylic esters of hydroquinone, 4,4'-dihydroxydiphenyl, 2,2-bis(4-hydroxyphenyl)propane, cresols or alkylene polyols containing 2 to 12 carbon atoms.

For instance, the present copolymers or cooligomers comprise monomer units derived from at least one monomer selected from the group consisting of acrylamide, methacrylamide, N-methylacrylamide, N,N-dimethylacrylamide, N,N-dimethyl(meth)acrylamide, N-isopropyl(meth)acrylamide, diacetone acrylamide and N-morpholinoacrylamide, monomer units derived from at least one monomer selected from the group consisting of dimethylaminoethyl acrylate, dimethylaminoethyl methacrylate, diethylaminoethyl methacrylate, dimethylaminopropyl acrylamide, tert-butylaminoethyl methacrylate, dimethylaminopropyl methacrylamide, allyl amine, 2-vinylpyridine, 4-vinylpyridine and N',N'-dimethylaminoethyl-N, N-dimethylammonium-N-propyl methacrylate chloride, monomer units derived from at least one monomer selected from the group consisting of unstaurated esters of polyalkoxylated $C_{8-32}$ alcohols, unstaurated esters of poly alkylene glycols, unsaturated ethers of polyalkoxylated $C_{8-32}$ alcohols and unsaturated ethers of poly alkylene glycols and monomer units derived from at least one monomer selected from the group consisting of acrylic and methacrylic esters of ethylene glycol, 1,2- or 1,3-propanediol, 1,2-, 1,3- or 1,4-butanediol, pentanediol, hexanediol, octanediol, dodecanediol, diethylene glycol, triethylene glycol, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol, tripentaerythritol, 2,2-bis(4-hydroxyphenyl)propane or sorbitol.

The copolymers or cooligomers of this invention may be of any molecular weight. They may for example have a molecular weight of about 1,000 to about 2 million, or for example, a molecular weight of about 1,000 to about 2 million The copolymers or cooligomers of this invention are advantageously employed in any layer of a coated or laminated article. They may be employed in one coating layer, more than one of the layers, or in all of the layers.

The copolymers or cooligomers of this invention may be employed as the primary component of a coating or as a smaller part of a formulation.

Coating compositions comprising the copolymers or cooligomers of this invention may contain other resins or adjuvants as commonly encountered in coatings and inks including thermoset and elastomeric resins, solvents, surfactants colorants, dispersants stabilizers etc.

Said other resins include polyurethanes, polyesters, polyvinyl alcohols, alkyds, other polyacrylates or polyacrylamides, chlorinated polyolefins, fluorinated polymers, epoxy resins, silicone containing polymers etc. Coatings are frequently crosslinked with, for example, melamine resins, urea resins, isocyanates, isocyanurates, polyisocyanates, epoxy resins, anhydrides, poly acids and amines.

Coating compositions comprising the copolymers or cooligomers of this invention may be advantageously employed as primer coatings. For example, such primer coatings are applied to a polymeric substrate which is then coated with an additional coating such as a paint or ink which would otherwise have poor adhesion to the polymer.

EXAMPLES

The following Examples help illustrate but do not limit the present invention. Unless otherwise noted, ratios and levels are in weight percent. Due to rounding and the small amount of some constituents, totals may not always equal exactly 100%.

The present Examples demonstrate the adhesion of coatings prepared using copolymers according to the present invention.

Copolymer A

The copolymer of the instant invention consisting of 45% methyl methacrylate, 49.6% dimethylaminoethyl methacrylate, 5% stearyl 10 mol ethoxylate allyl ether and 0.375% pentaerythritol triacrylate is prepared according to conventional free radical techniques, for example according to the disclosure of US 2002/0127376, as an emulsion in water, approximately 30% solids.

| Copolymer | % MMA | % DMAEMA | % RS10AE | % PETA |
|---|---|---|---|---|
| B | 50 | 30 | 20 | 0.5 |
| C | 40 | 40 | 20 | 0.5 |
| D | 50 | 30 | 20 | 0.25 |
| E | 60 | 30 | 10 | 0.5 |
| F | 50 | 40 | 10 | 0.5 |
| G | 40 | 50 | 10 | 0.25 |

The following copolymers are likewise prepared:

Coating Adhesion

Copolymer A is neutralized with formic acid to a pH of approximately 4.5 and adjusted to approximately 10% solids and is applied by Meyer bar to polyester and polycarbonate substrates and dried to form a coated layer on the substrates.

A mixture of polyvinyl alcohol, GH-23 available from Nippon Gohsei, and water, approximately 10% solids, is applied by Meyer bar to polyester and polycarbonate substrates and dried to form a coated layer on the substrates.

A 10% solids mixture in water of neutralized Copolymer A and polyvinyl alcohol GH-23, at ratios of Copolymer A/polyvinyl alcohol of 75/25 and 50/50 based on dry weight of the polymers is prepared and applied by Meyer bar to polyester and polycarbonate substrates and dried to form a coated layer on the substrates.

All wet coatings are dried in a convection oven at 90° C. for 20 minutes to form a dry film. Dry film thickness are measured with a Permascope E110B-T3.3. Representative film thicknesses are:

| Coating Resin(s) | Thickness (mils) |
|---|---|
| Polyvinyl Alcohol | 0.65 |
| Copolymer A | 0.80 |
| Copolymer A/Polyvinyl Alcohol | |
| 75/25 | 0.78 |
| 50/50 | 0.82 |

The adhesion of the dried coatings to the substrates is determined by making perpendicular cuts in the coating with a razor blade to form a lattice and then attempting removal of the coating by firmly Appling either masking tape or duck tape to the coating, rubbing the back of the tape with an eraser and then pulling the tape off the coating sample at the angle according to ASTM method D 3359-02, test method B.

A classification of 5B indicates that the edges of the cuts are completely smooth, and none of the squares of the lattice are detached. A classification of 4B indicates that small flakes of the coating are detached at intersections, and less than 5% of the area is affected. 3B indicates small flakes of the coating are detached along edges and at intersections of cuts, and the area affected is 5 to 15% of the lattice. 2B indicates the coating has flaked along the edges and on parts of the squares, affecting 15 to 35% of the lattice. 1 B indicates the coating has flaked along the edges of cuts in large ribbons and whole squares have detached. In the 1 B case, 35 to 65% of the lattice is affected. For a classification of 0B, the indication is that the flaking and detachment are worse than for classification 1, showing greater than 65% of the lattice to be affected.

Tests are run in triplicate. Results are shown in the Following tables.

Example 1

| Coatings on untreated biaxially orientated polyethylene terepthalate (Polyester Substrate, DUPONT MELINEX 401) | | |
|---|---|---|
| Coating Resin(s) | Classification | % Area Removed |
| Polyvinyl Alcohol | 0B | 100% |
| | 0B | 96.30% |
| | 0B | 100% |
| Copolymer A | 5B | 0% |
| | 5B | 0% |
| | 5B | 0% |
| Copolymer A/polyvinyl alcohol | | |
| 75/25 | 5B | 0% |
| | 5B | 0% |
| | 5B | 0% |
| 50/50 | 0B | 100% |
| | 0B | 100% |
| | 0B | 100% |

Adhesion to the polyester substrate of the Copolymer A coating is excellent; the adhesion of the Polyvinyl Alcohol is extremely poor. The coating containing the 75/25 blend of the Copolymer A/polyvinyl alcohol has excellent adhesion.

Example 2

| Coatings on clear polycarbonate (Polycarbonate Substrate, POLYMER PLASTICS CORPORATION, CLEAR LEXAN) | | |
|---|---|---|
| Coating Resin(s) | Classification | % Area Removed |
| Polyvinyl Alcohol | 0B | 100% |
| | 0B | 100% |
| | 0B | 98.76% |
| Copolymer A | 5B | 0% |
| | 5B | 0% |
| | 5B | 0% |
| Copolymer A/Polyvinyl Alcohol | | |
| 75/25 | 5B | 0% |
| | 5B | 0% |
| | 5B | 0% |
| 50/50 | 0B | 100% |
| | 0B | 100% |
| | 0B | 100% |

Adhesion to the polycarbonate substrate of the Copolymer A coating is excellent; the adhesion of the Polyvinyl Alcohol is extremely poor. The coating containing the 75/25 blend of the Copolymer A/polyvinyl alcohol has excellent adhesion.

Example 3

The efficacy of the polymers of the instant invention as adhesion promoters for coatings over thermoplastic polyolefin is compared to the efficacy of commercial chlorinated polyolefin (CPO) adhesion promoters.

Three commercial CPO adhesion promoters, EASTMAN 343-1, 550-1 and 730-1, were obtained and reduced to 5% solids with xylene.

The neutralized Copolymer A from above is reduced to 5% solids with distilled water.

Each of the 5% solids formulations are repeatedly sprayed out in wedges onto thermoplastic polyolefin plaques (STANDARD PLAQUE INC. SOLVAY BLACK 1440 TPO), the thus formed coatings are dried and the dry film thickness determined. Two the commercial CPO adhesion promoters, EASTMAN 343-1, 550-1, yield a sticky film which can not be accurately measured, the remaining CPO adhesion promoter, EASTMAN 730-1, yields films between 0.3-0.6 mils thick, Copolymer. A yields films between 0.2-0.4 mils thick.

Films of each of the four formulations are tested for adhesion using 3 mm cross hatch adhesion tests using masking tape or duck tape in an attempt to remove the film after scoring the surface with a razor blade.

All formulations show good adhesion.

Example 4

The remaining films from Example 3 are coated with a commercial coating system, the solvent is evaporated and the films baked in an oven for 1 hour at 60° C.

Base coat/clear coat system obtained from MATRIX SYSTEM AUTOMOTIVE FINISHES INC.

| Base Coat Formulation | |
|---|---|
| MATRIX MT-89 | 60 |
| MATRIX MT 54 | 40 |
| MATRIX MR 0870 | 100 |
| Clear Coat Formulation | |
| MS 42 | 50 |
| MH 005 | 50 |
| N-butyl acetate | 15 |
| PM acetate | 15 |

A selection of coated films of each adhesion promoter are tested as above for adhesion.

All formulations show good adhesion.

The remaining coated films are aged in an oven for 16 hours at 60° C. A selection of coated films of each adhesion promoter are tested as above for adhesion.

All commercial CPO systems showed 100% adhesion. The Copolymer A system demonstrated 90-95% adhesion.

The Copolymers of the instant invention show good adhesion to a variety of polymeric substrates.

What is claimed:

1. A method for improving the adhesion of coatings to an inorganic or organic substrate wherein at least one copolymer or cooligomer comprising monomer units derived from
    at least one monomer selected from the group consisting of acrylate and acrylamide monomers,
    at least one monomer selected from the group consisting of amine containing ethylenically unsaturated monomers,
    at least one monomer selected from the group consisting of ethylenically unsaturated associative monomers and
    at least one monomer selected from the group consisting of polyacrylates of polyols,
    is added to the coating and
    the copolymer or cooligomer is at least partially neutralized with acid prior to application to the inorganic or organic substrate.

2. A method according to claim 1 wherein prior to application of the coating to the inorganic or organic substrate, the coating has a pH of from about 3 to about 7 as measured in water.

3. A method according to claim 1 wherein the at least one copolymer or cooligomer added to the coating comprises:
    from about 20 to about 80 weight percent monomer units derived from at least one monomer selected from the group consisting of acrylate and acrylamide monomers,
    about 20 to about 80 weight percent monomer units derived from at least one monomer selected from the group consisting of amine containing ethylenically unsaturated monomers,
    about 0.5 to about 30 weight percent monomer units derived from at least one ethylenically unsaturated associative monomer selected from stearyl ethoxy (25) methacrylate, stearyl ethoxy (20) methacrylate, behenyl ethoxy (25) methacrylate, stearyl ethoxy (10) allyl ether, poly(ethylene glycol)(meth)acrylate, poly(ethylene glycol)monomethyl ether mono(meth)acrylate, poly(ethylene glycol)acrylate and poly(ethylene glycol)monomethyl ether monoacrylate wherein the numbers in parentheses mean the number of repeating ethoxy units,
    and from about 0.01 to about 10 weight percent monomer units derived from at least one monomer selected from the group consisting of polyacrylates of polyols.

4. A method according to claim 3 wherein the acrylate and acrylamide monomers are acrylate monomers selected from acrylic acid, methacrylic acid, acrylic esters of alcohols containing from 1 to 22 carbon atoms and methacrylic esters of alcohols containing from 1 to 22 carbon atoms, and the amine containing ethylenically unsaturated monomers are selected from the group consisting of dialkylaminoalkyl acrylates, dialkylaminoalkyl methacrylates, dialkylaminoalkylacrylamides dialkylaminoalkyl(meth)acrylamides, allyl amine, 2-vinylpyridine, 4-vinylpyridine and N',N'-dimethylaminoethyl-N,N-dimethylammonium-N-propyl methacrylate chloride.

5. A method according to claim 3 wherein
    the acrylate and acrylamide monomers are selected from the group consisting of acrylamide, methacrylamide, methyl acrylate, methyl methacrylate, diacetone acrylamide and N,N-dimethyl acrylamide,
    the amine containing ethylenically unsaturated monomers are selected from the group consisting of dimethylaminopropyl acrylamide, dimethylaminopropyl methacrylamide, dimethylaminoethyl methacrylate and tert-butylaminoethyl methacrylate
    the ethylenically unsaturated associative monomers are selected from the group consisting of stearyl ethoxy (25) methacrylate, stearyl ethoxy (20) methacrylate, behenyl ethoxy (25) methacrylate, stearyl ethoxy (10) allyl ether, poly(ethylene glycol)(meth)acrylate, poly(ethylene glycol)monomethyl ether mono(meth)acrylate, poly(ethylene glycol)acrylate and poly(ethylene glycol)monomethyl ether monoacrylate wherein the numbers in parentheses mean the number of repeating ethoxy units,
    the polyacrylates of polyols are selected from the group consisting of ethylene glycol diacrylate, propylene glycol diacrylate, neopentyl glycol diacrylate, hexamethylene glycol diacrylate, 1,4-butanediol diacrylate, 1,4-butanediol dimethacrylate, bisphenol A diacrylate, bisphenol A diamethacrylate, 4,4'-bis(2-acryloyloxyethoxy)diphenylpropane, trimethylolpropane triacrylate, tris(2-acryloylethyl)isocyanurate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, 1,3-butanediol diacrylate, 1,3-butanediol dimethacrylate, sorbitol triacrylate, sorbitol tetraacrylate, pentaerythritol-modified triacrylate, sorbitol tetramethacrylate, sorbitol pentacrylate, sorbitol hexacrylate, glycerol di- or triacrylate and 1,4-cyclohexanediacrylate.

6. A method for coating an inorganic or organic substrate or inorganic or organic metalized substrate, wherein a coating composition comprising at least one copolymer or cooligomer comprising monomer units derived from at least one monomer selected from the group consisting of acrylate and acrylamide monomers, at least one monomer selected from the group consisting of amine containing ethylenically unsaturated monomers, at least one monomer selected from the group consisting of ethylenically unsaturated associative monomers and at least one monomer selected from the group consisting of polyacrylates of polyols, as adhesion promoter is prepared, the copolymers or cooligomers are partially or fully neutralized with a neutralizing acid prior to or upon incorporation into the coating composition, the partially or fully neutralized coating composition is applied to the surface of a substrate or between two substrates and the coating composition is dried or cured under ambient conditions, under vacuum or reduced pressure, by heating, or by exposure to ultraviolet light.

7. A method according to claim 6, wherein the neutralizing acid is partially or fully removed upon drying or curing.

8. A method according to claim 7, wherein the acid is a carboxylic acid.

9. A method according to claim 8, wherein the carboxylic acid is selected from the group consisting of formic acid, acetic acid, propionic acid, glycolic acid, lactic acid and citric acid.

10. A method according to claim 6, wherein the inorganic or organic substrate or inorganic or organic metalized substrate is a thermoplastic, elastomeric, crosslinked or inherently crosslinked polymer.

11. A method according to claim 10, wherein the thermoplastic, elastomeric crosslinked or inherently crosslinked polymer is a polyolefin, thermoplastic polyolefin, polyurethane, polyamide, polyacrylate, polycarbonate, polystyrene, polyester or a halogenated vinyl polymer.

12. A method according to claim 6 wherein the partially or fully neutralized composition composition has a pH of from about 3 to about 7 as measured in water.

13. A method according to claim 6 wherein the at least one copolymer or cooligomer added to the coating comprises:

from about 20 to about 80 weight percent monomer units derived from at least one monomer selected from the group consisting of acrylate and acrylamide monomers, about 20 to about 80 weight percent monomer units derived from at least one monomer selected from the group consisting of amine containing ethylenically unsaturated monomers, about 0.5 to about 30 weight percent monomer units derived from at least one ethylenically unsaturated associative monomer selected from stearyl ethoxy (25) methacrylate, stearyl ethoxy (20) methacrylate, behenyl ethoxy (25) methacrylate, stearyl ethoxy (10) allyl ether, poly(ethylene glycol)(meth)acrylate, poly(ethylene glycol)monomethyl ether mono(meth)acrylate, poly(ethylene glycol)acrylate and poly(ethylene glycol)monomethyl ether monoacrylate wherein the numbers in parentheses mean the number of repeating ethoxy units, and from about 0.01 to about 10 weight percent monomer units derived from at least one monomer selected from the group consisting of polyacrylates of polyols.

14. A method according to claim 13 wherein the acrylate and acrylamide monomers are acrylate monomers selected from acrylic acid, methacrylic acid, acrylic esters of alcohols containing from 1 to 22 carbon atoms and methacrylic esters of alcohols containing from 1 to 22 carbon atoms, and the amine containing ethylenically unsaturated monomers are selected from the group consisting of dialkylaminoalkyl acrylates, dialkylaminoalkyl methacrylates, dialkylaminoalkylacrylamides, dialkylaminoalkyl(meth)acrylamides, allyl amine, 2-vinylpyridine, 4-vinylpyridine and N',N'-dimethylaminoethyl-N,N-dimethylammonium-N-propyl methacrylate chloride.

15. A method according to claim 13 wherein the acrylate and acrylamide monomers are selected from the group consisting of acrylamide, methacrylamide, methyl acrylate, methyl methacrylate, diacetone acrylamide and N,N-dimethyl acrylamide, the amine containing ethylenically unsaturated monomers are selected from the group consisting of dimethylaminopropyl acrylamide, dimethylaminopropyl methacrylamide, dimethylaminoethyl methacrylate and tert-butylaminoethyl methacrylate, the ethylenically unsaturated associative monomers are selected from the group consisting of stearyl ethoxy (25) methacrylate, stearyl ethoxy (20) methacrylate, behenyl ethoxy (25) methacrylate, stearyl ethoxy (10) allyl ether, poly(ethylene glycol)(meth)acrylate, poly(ethylene glycol)monomethyl ether mono(meth)acrylate, poly(ethylene glycol)acrylate and poly(ethylene glycol)monomethyl ether monoacrylate wherein the numbers in parentheses mean the number of repeating ethoxy units, the polyacrylates of polyols are selected from the group consisting of ethylene glycol diacrylate, propylene glycol diacrylate, neopentyl glycol diacrylate, hexamethylene glycol diacrylate, 1,4-butanediol diacrylate, 1,4-butanediol dimethacrylate, bisphenol A diacrylate, bisphenol A diamethacrylate, 4,4'-bis(2-acryloyloxyethoxy)diphenylpropane, trimethylolpropane triacrylate, tris(2-acryloylethyl)isocyanurate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, 1,3-butanediol diacrylate, 1,3-butanediol dimethacrylate, sorbitol triacrylate, sorbitol tetraacrylate, pentaerythritol-modified triacrylate, sorbitol tetramethacrylate, sorbitol pentacrylate, sorbitol hexacrylate, glycerol di- or triacrylate and 1,4-cyclohexanediacrylate.

* * * * *